United States Patent
Cui et al.

(10) Patent No.: US 10,243,682 B2
(45) Date of Patent: Mar. 26, 2019

(54) TIME-DOMAIN AND FREQUENCY-DOMAIN APPROACH TO FREQUENCY OFFSET CORRECTION METHOD FOR LTE SC-FDMA UPLINK

(71) Applicant: PhasorLab, Inc., Billerica, MA (US)

(72) Inventors: Jian Cui, Waltham, MA (US); Joshua C. Park, Billerica, MA (US); Paul McFarthing, Boston, MA (US)

(73) Assignee: PhasorLab, Inc., Billerica, MA (US)

( * ) Notice: Subject to any disclaimer, the term of this patent is extended or adjusted under 35 U.S.C. 154(b) by 0 days.

(21) Appl. No.: 15/683,770

(22) Filed: Aug. 22, 2017

(65) Prior Publication Data

US 2018/0054269 A1 Feb. 22, 2018

Related U.S. Application Data

(60) Provisional application No. 62/378,181, filed on Aug. 22, 2016.

(51) Int. Cl.
*H04J 11/00* (2006.01)
*H04L 25/03* (2006.01)
(Continued)

(52) U.S. Cl.
CPC .... *H04J 11/0036* (2013.01); *H04L 25/03821* (2013.01); *H04L 27/265* (2013.01);
(Continued)

(58) Field of Classification Search
CPC ............ H04J 11/0036; H04J 2211/006; H04J 2011/0096; H04J 11/0023; H04J 11/004;
(Continued)

(56) References Cited

U.S. PATENT DOCUMENTS 5,276,703 A * 1/1994 Budin ................... H04W 74/02
370/347
6,198,782 B1 * 3/2001 De Courville ...... H04L 27/2657
370/208
(Continued)

OTHER PUBLICATIONS

Zhen Gao & Mary Ann Ingram, "Self-Cancellation of Sample Frequency Offset in OFDM Systems in the Presence of Carrier Frequency Offset," IEEE Vehicular Technology Conference Fall (VTC 2010—Fall), 2010 IEEE 72nd, pp. 1-5.

(Continued)

*Primary Examiner* — Warner Wong
(74) *Attorney, Agent, or Firm* — Michael Y. Saji

(57) ABSTRACT

Systems and methods for canceling carrier frequency offset (CFO) and sampling frequency offset (SFO) in a radio receive chain are disclosed. In one embodiment, a method is disclosed, comprising: receiving a sub-frame via a radio receive chain in a time domain; performing per-user filtering on the sub-frame to obtain a signal for a particular user; obtaining a CFO correction signal; adding the CFO correction signal in the time domain to perform a CFO correction step on the signal for the particular user; performing an FFT on the output of the CFO correction step to obtain samples in a frequency domain; adding an SFO correction signal in the frequency domain to perform an SFO correction to the output of FFT step; and demodulating the output of SFO correction step, thereby performing CFO and SFO correction while reducing inter-carrier interference (ICI).

21 Claims, 13 Drawing Sheets

(51) Int. Cl.
*H04L 27/26* (2006.01)
*H04L 27/36* (2006.01)

(52) U.S. Cl.
CPC ...... *H04L 27/2626* (2013.01); *H04L 27/2657* (2013.01); *H04L 27/2676* (2013.01); *H04L 27/36* (2013.01); *H04J 2011/0096* (2013.01); *H04J 2211/006* (2013.01); *H04L 27/2636* (2013.01)

(58) Field of Classification Search
CPC ............. H04L 7/0016; H04L 25/03821; H04L 25/0328; H04L 25/3305; H04L 25/08; H04L 27/265; H04L 27/2657; H04L 27/36; H04L 27/2606; H04L 27/2082; H04L 27/2691; H04L 27/2668; H04L 27/2669; H04L 27/71; H04L 27/72; H04L 27/2628; H04L 27/2636; H04L 2203/0076; H04L 2027/0026; H04L 2027/0042

See application file for complete search history.

(56) References Cited

U.S. PATENT DOCUMENTS

| | | | | |
|---|---|---|---|---|
| 6,567,480 B1* | 5/2003 | Brardjanian | H04L 7/0054 | 329/315 |
| 6,628,735 B1* | 9/2003 | Belotserkovsky | H04L 27/2662 | 370/203 |
| 7,756,003 B1* | 7/2010 | Lee | H04L 27/2657 | 370/208 |
| 7,940,849 B1* | 5/2011 | Fang | H04L 27/2657 | 375/260 |
| 9,197,400 B1* | 11/2015 | Fang | H04L 27/2657 | |
| 9,860,349 B2* | 1/2018 | Yu | H04L 69/321 | |
| 2004/0109508 A1* | 6/2004 | Jeon | H04L 27/2657 | 375/260 |
| 2004/0131012 A1* | 7/2004 | Mody | H04B 7/0413 | 370/210 |
| 2006/0176802 A1* | 8/2006 | Ko | H04L 27/2657 | 370/208 |
| 2007/0019748 A1* | 1/2007 | Hoo | H04L 27/2657 | 375/260 |
| 2007/0153927 A1* | 7/2007 | Ma | H04L 25/022 | 375/260 |
| 2008/0095250 A1* | 4/2008 | Kim | H04L 27/266 | 375/260 |
| 2009/0175394 A1* | 7/2009 | Park | H04L 27/2659 | 375/362 |
| 2009/0180466 A1* | 7/2009 | Soul | H03J 7/04 | 370/350 |
| 2010/0027698 A1* | 2/2010 | Kim | H04L 5/0042 | 375/260 |
| 2013/0170568 A1* | 7/2013 | Prihed | H04L 25/03821 | 375/260 |
| 2014/0169508 A1* | 6/2014 | Wei | H04L 27/265 | 375/343 |
| 2015/0256373 A1* | 9/2015 | Huang | H04L 5/0066 | 375/260 |
| 2016/0277893 A1* | 9/2016 | Katabi | H04L 43/0852 | |
| 2018/0097917 A1* | 4/2018 | Yu | H04L 69/321 | |
| 2018/0254826 A1* | 9/2018 | Jungnickel | H04B 10/1149 | |

OTHER PUBLICATIONS

Maja Sliskovic, "Sampling Frequency Offset Estimation and Correction in OFDM Systems," IEEE, Electronics, Circuits and Systems, 2001. ICECS 2001, pp. 437-440.

\* cited by examiner

TIME-DOMAIN AND FREQUENCY-DOMAIN APPROACH TO FREQUENCY OFFSET CORRECTION METHOD FOR LTE SC-FDMA UPLINK

CROSS-REFERENCE TO RELATED APPLICATIONS

This application claims the benefit of priority under 35 U.S.C. § 119(e) of U.S. Provisional Patent Application No. 62/378,181, filed Aug. 22, 2016 and titled "Time-Domain and Frequency-Domain Approach to Frequency Offset Correction Method for LTE SC-FDMA Uplink," which is hereby incorporated by reference in its entirety for all purposes. Additionally, U.S. Pat. Nos. 9,048,979, 9,048,980 ([1]), U.S. Pat. No. 9,538,537 ([2]); U.S. Pat. App. Publication No. US20170111197A1 [3]; Z. Gao et al, "Self-Cancellation of Sample Frequency Offset in OFDM Systems in the Presence of Carrier Frequency Offset," IEEE VTC September 2010 Ottawa, Canada ([4]); and M. Sliskovic, "Sampling frequency offset estimation and correction in OFDM systems," in IEEE-GlobalComm, vol. 1, 2001, San Antonio ([5]) are each hereby incorporated by reference in their entirety for all purposes.

BACKGROUND

Carrier synchronization provides a means to improve the data throughput between the nodes of a communication link by removing the frequency offset that can impose limitations on the order of a modulation that is used. Typically, the higher the order of the modulation used, the more susceptible it is to perturbations that may be random or systematic in nature; the former typically arise from Doppler frequency, and the latter is from the frequency difference between the difference of LOs (local oscillator) at transmitter and receiver.

High-Precision Carrier Synchronization Technology (HPCST) in its original form is a time-domain approach whereby the average correlation between the in-phase and quadrature components of a signal is used to find where the applied frequency and phase offsets precisely cancel out the offset present in the signal, as described in U.S. Pat. No. 9,048,980, hereby incorporated by reference in its entirety. These offsets are a consequence of the transmitter and receiver systems not being synchronized. Further theoretical background appears below.

While existing methods address blind synchronization in general, a need exists to specifically provide greater synchronization of mobile stations with base stations in cellular networks, such as in Long Term Evolution (LTE), which can thereby enable higher data throughput at higher speeds or increased service availability in the cell range.

SUMMARY

This document presents a new method of carrier frequency offset (CFO) and sampling frequency offset (SFO) corrections for LTE SC-FDMA uplink. According to the conventional method, CFO/SFO are corrected in the frequency domain, relying on a reference signal embedded in the received signal. One of the major drawbacks of this frequency-domain method is the inter carrier interference (ICI) introduced due to CFO, which destroys the orthogonality between subcarriers in the OFDM system. ICI cannot be corrected in frequency domain with simple FIR-type equalization. In this document we demonstrate through simulation studies that utilizing PhasorLab's high performance frequency synchronization method makes it possible to perform CFO correction in the time domain and SFO correction in the frequency domain resulting in superior performance. Simulation shows that with this new approach, a significant SNR gain can be achieved compared to conventional methods, which makes it possible to increase system throughput or system coverage. The detailed implementation method is presented in the following sections.

Systems and methods for canceling carrier frequency offset (CFO) and sampling frequency offset (SFO) in a radio receive chain are disclosed. In one embodiment, a method is disclosed, comprising: receiving a sub-frame via a radio receive chain in a time domain; performing per-user filtering on the sub-frame to obtain a signal for a particular user; obtaining a CFO correction signal; adding the CFO correction signal in the time domain to perform a CFO correction step on the signal for the particular user; performing an FFT on the output of the CFO correction step to obtain samples in a frequency domain; adding an SFO correction signal in the frequency domain to perform an SFO correction to the output of FFT step; and demodulating the output of SFO correction step, thereby performing CFO and SFO correction while reducing inter-carrier interference (ICI).

The sub-frame may be a Long-Term Evolution (LTE) single-carrier frequency division multiple access (SC-FDMA) uplink frame. The method may further comprise determining the CFO correction signal based on a prior sub-frame within a prior frame. The method may further comprise determining the CFO correction signal based on a prior sub-frame within a prior frame immediately prior to the received frame. The prior sub-frame may have a sub-frame time index equal to a sub-frame time index of the sub-frame. The sub-frame period may be 1 ms. The method may further comprise performing CFO correction steps for each sub-frame using a CFO correction signal based on a prior sub-frame within an immediately prior frame. Obtaining the CFO correction signal may further comprise obtaining the CFO correction signal for the particular user from a prior sub-frame. The method may further comprise obtaining the CFO correction signal based on a time domain, a frequency domain, or a frequency and time domain method. The method may further comprise obtaining the CFO correction signal without a preamble or pilot symbol. The method may further comprise obtaining the CFO correction signal with an accuracy of estimation of between 1 ppb and 10 ppb.

The method may further comprise performing CFO correction at both a transmitter and a receiver, thereby enabling a synchronized transmitter and a synchronized receiver. The method may further comprise performing CFO correction for each of a plurality of users. The method may further comprise identifying dominant users and performing the CFO correction step for each of the dominant users. The dominant users may be users with a high data rate or users with larger frequency offsets. The method may further comprise tracking frequency variation due to Doppler frequency variation from a moving mobile user. The sub-frame may be either a Wi-Fi, orthogonal frequency division multiplexing (OFDM), or Long-Term Evolution (LTE) sub-frame. Each transmitting user may use an entirety of a frequency band. The method may further comprise providing SFO correction at an access point or base station. The method may further comprise performing ICI correction for ICI error that may be not correctable in the frequency domain. CFO error may comprise frequency synchronization error and SFO error may comprise phase synchronization error. The method may further comprise obtaining the CFO correction signal by either a frequency offset estimation method in the time domain, a frequency offset estimation method in the frequency domain, or a frequency offset estimation method in the time domain and in the frequency domain.

Obtaining the CFO correction signal may further comprise: downconverting a received orthogonal frequency division multiplexed (OFDM) signal to baseband; identifying, from the downconverted received signal, a series of OFDM symbols in a time domain; performing a fast Fourier transform (FFT) on a block of several time domain samples to turn the time domain OFDM symbols into frequency domain OFDM symbols, one sample per subcarrier in the received OFDM signal; computing a cross-correlation between in-phase and quadrature samples in each subcarrier and for each frequency domain OFDM symbol, wherein the cross-correlation is computed as a sum of products of either squares or absolute values of the in-phase and quadrature samples; and summing the computed cross-correlation across the series of symbols and across all subcarriers to determine a frequency offset for the received OFDM signal.

The received OFDM signal may be quadrature amplitude modulation (QAM) modulated and the received OFDM signal may be a Wi-Fi, WiMAX, WiGig, or Long Term Evolution (LTE) signal. The method may further comprise obtaining resource blocks for each user using bandpass filtering on time domain samples, and obtaining frequency offset for each user using the per-user resource blocks.

In another embodiment, a system is disclosed, comprising: a radio receive chain for receiving an input orthogonal frequency domain multiplexed (OFDM) signal; a baseband processor coupled to the radio receive chain and capable of computing a Fourier transform; and a non-transitory computer-readable medium comprising instructions that, when executed by the baseband processor, cause the system to perform steps comprising: obtaining orthogonal frequency division multiplexed (OFDM) symbols from the input OFDM signal that are in a time domain; performing a Fourier transform on the time domain OFDM symbols to obtain OFDM symbols in a frequency domain; determining a frequency offset based on an estimated correlation between the in-phase signal samples and the quadrature signal samples summed over each subcarrier and summed over each frequency domain OFDM symbol; receiving a sub-frame via a radio receive chain in a time domain; performing per-user filtering on the sub-frame to obtain a signal for a particular user; obtaining a CFO correction signal; adding the CFO correction signal in the time domain to perform a CFO correction step on the signal for the particular user; performing an FFT on an output of the CFO correction step to obtain samples in a frequency domain; adding an SFO correction signal in the frequency domain to perform an SFO correction to an output of the FFT step; and demodulating an output of the SFO correction step, thereby performing CFO correction in the time domain and SFO correction in the frequency domain. The system may further comprise an antenna for receiving time domain samples; a carrier frequency offset correction module coupled to a time domain portion of the radio receive chain; a fast Fourier transform module coupled to an output of the carrier frequency offset correction module; and a sampling frequency offset correction module coupled to an output of the fast Fourier transform module.

Various steps as described in the figures and specification may be added or removed from the processes described herein, and the steps described may be performed in an alternative order, consistent with the spirit of the invention. Features of one embodiment may be used in another embodiment. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

DETAILED DESCRIPTION

Frequency-Domain OFDM HPCST

PhasorLab's patented orthogonal frequency division multiplexing (OFDM) carrier synchronization technology is well suited for the LTE downlink, as described in U.S. Pat. No. 9,538,537, hereby incorporated by reference herein in its entirety. Here the correlation between the in-phase and quadrature components of the frequency domain representation of a signal is used to identify the frequency and phase offset between the transmitter and receiver systems. Identifying these offsets to a high level of precision opens up the possibility to transmit higher order modulations in a given channel than would otherwise be possible. Refer to Appendix B of U.S. Pat. No. 9,538,537 for the theoretical background of the disclosed Blind Carrier Synchronization Method for OFDM Wireless Communication Systems.

SC-FDMA in LTE Uplink

The 3GPP LTE wireless standard uses single-carrier frequency division multiple access (SC-FDMA) modulation in an uplink (UL) channel from a mobile station (MS) to a base station (BS) to limit the power amplifier (PA) back-off in user equipment, whereas OFDMA is used for multiple access in the downlink channel.

A link can either be scheduled to be time division duplex (TDD) or frequency division duplex (FDD); in the former, BS and MS take turns to transmit and receive, according to a known sequence, to avoid simultaneous transmission; in the latter, FDD, MS and BS transmit on widely separated frequencies to allow simultaneous transmission and reception and so potentially increase the data throughput. A BS schedules the uplink frequency and time slots in multiples of resource blocks (RBs) which are groups of 12 subcarriers separated by 15 kHz, giving a total bandwidth of multiples of 180 kHz, for one LTE time-slot of 0.5 ms. The position of the RBs assigned to a particular user can change on each 0.5 ms boundary.

Figure 1:
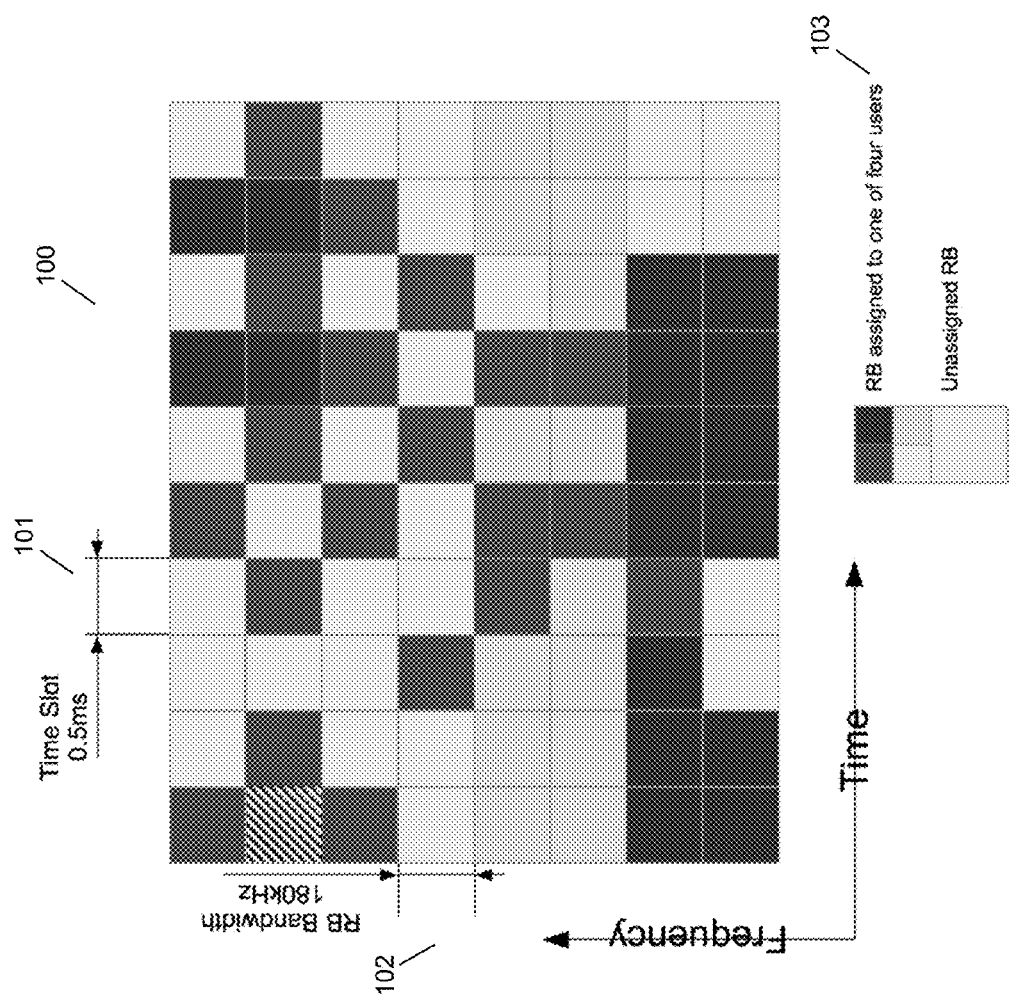
FIG. 1 is a schematic uplink resource grid diagram showing an example of assignation of resource blocks to different users, in accordance with some embodiments.

FIG. 1 is a schematic uplink resource grid diagram showing an example of assignation of resource blocks to different users, in accordance with some embodiments. Specifically, FIG. 1 shows a possible resource schedule or grid for four mobile stations over a period of 5 ms. In FIG. 1, an uplink resource grid 100 is shown showing how four different users may be assigned different resource blocks (RBs) during a frame consisting of 5 sub-frames, each of which is made from two 0.5 ms time slots, giving a total of 5 ms. This grid may be understood to show a schedule of all UEs during the frame. The width of each time slot 101 is 0.5 ms, and the bandwidth of each resource block 102 is 180 kHz. 103 shows a legend for the visual representation shown in FIG. 1.

Each 0.5 ms time slot 101 is composed of multiple symbols that are preceded by copies of the final portion of their time domain representation, termed the cyclic prefix (CP). LTE provides for two different CP length styles, normal and extended. With normal, there are seven OFDM symbols per 0.5 ms, and with extended, there are six as shown in FIG. 2.

Figure 2:
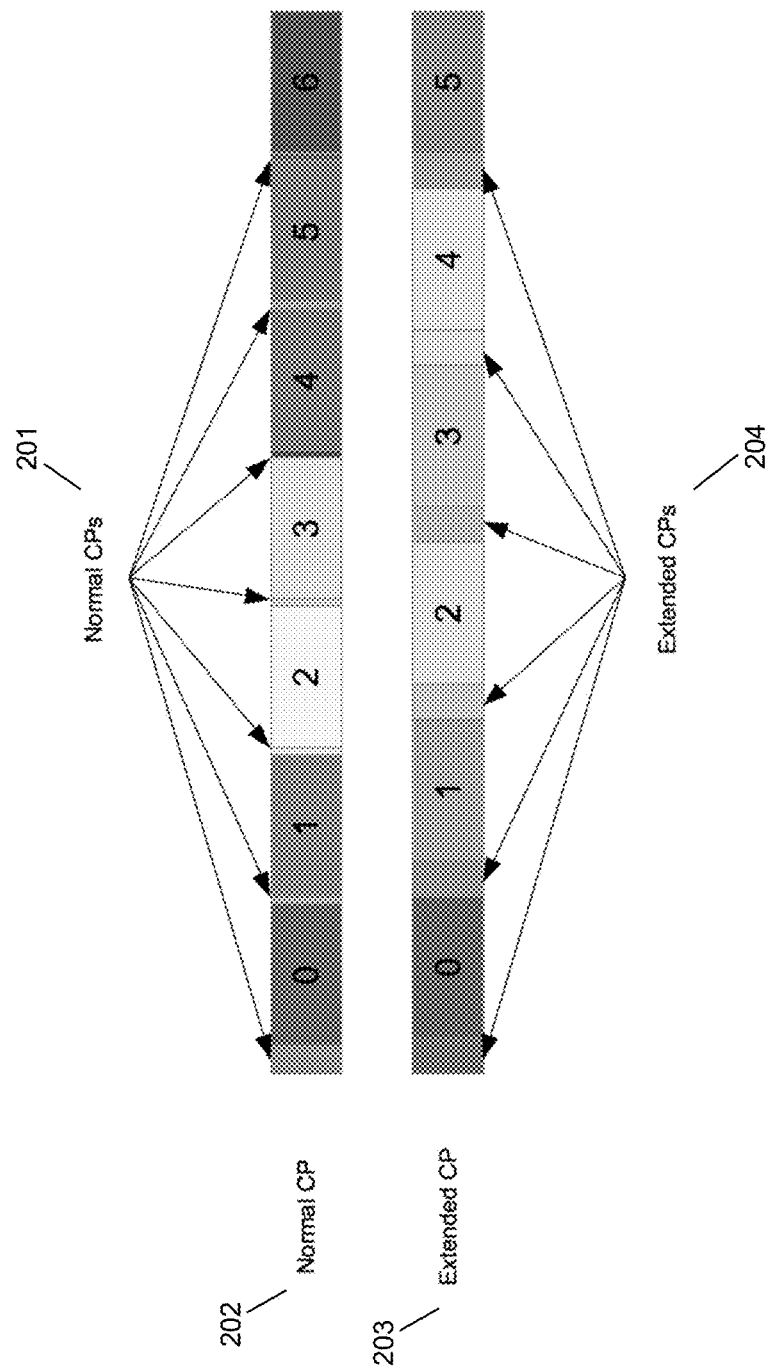
FIG. 2 is a schematic diagram of an LTE uplink time slot in normal and extended cyclic prefix mode, in accordance with some embodiments.

FIG. 2 is a diagram showing the composition of an LTE uplink time slot in normal and extended cyclic prefix (CP) mode, in accordance with some embodiments. As shown, either 7 or 6 data symbols are transmitted per 0.5 ms. Normal CP uplink time slot 202 is an LTE frame shown as symbols ordered by time from left to right, with intervening normal CP intervals 201 between symbols. Extended CP uplink time slot 203 is an LTE frame shown as symbols with intervening extended CP intervals 204 between symbols.

Depending on the format of the uplink channel being used, the LTE standard provides for training sequences, such as the demodulation reference signal (DRS), to be inserted at various symbol positions within a time slot to allow the BS to estimate characteristics of the transmission channel and apply corresponding corrections to the received data.

SC-FDMA, when compared with OFDM, involves an additional time-frequency transform that effectively spreads one data point across a number of sub-carriers, rather than a single data point modulating a single sub-carrier as in OFDM. This spreading is what gives SC-FDMA its desirable reduction in peak-to-mean ratio when compared with OFDM and gives rise to the notion of the data modulating a single carrier, at the center of the sub-carrier frequency range, rather than multiple sub-carriers. A consequence of this difference with OFDM is that the encoded data bits can be considered to originate in the time domain rather than frequency domain as shown in the example SC-FDMA transmit (Tx) and receive (Rx) chains in FIGS. 3A and 3B.

Figure 3A:
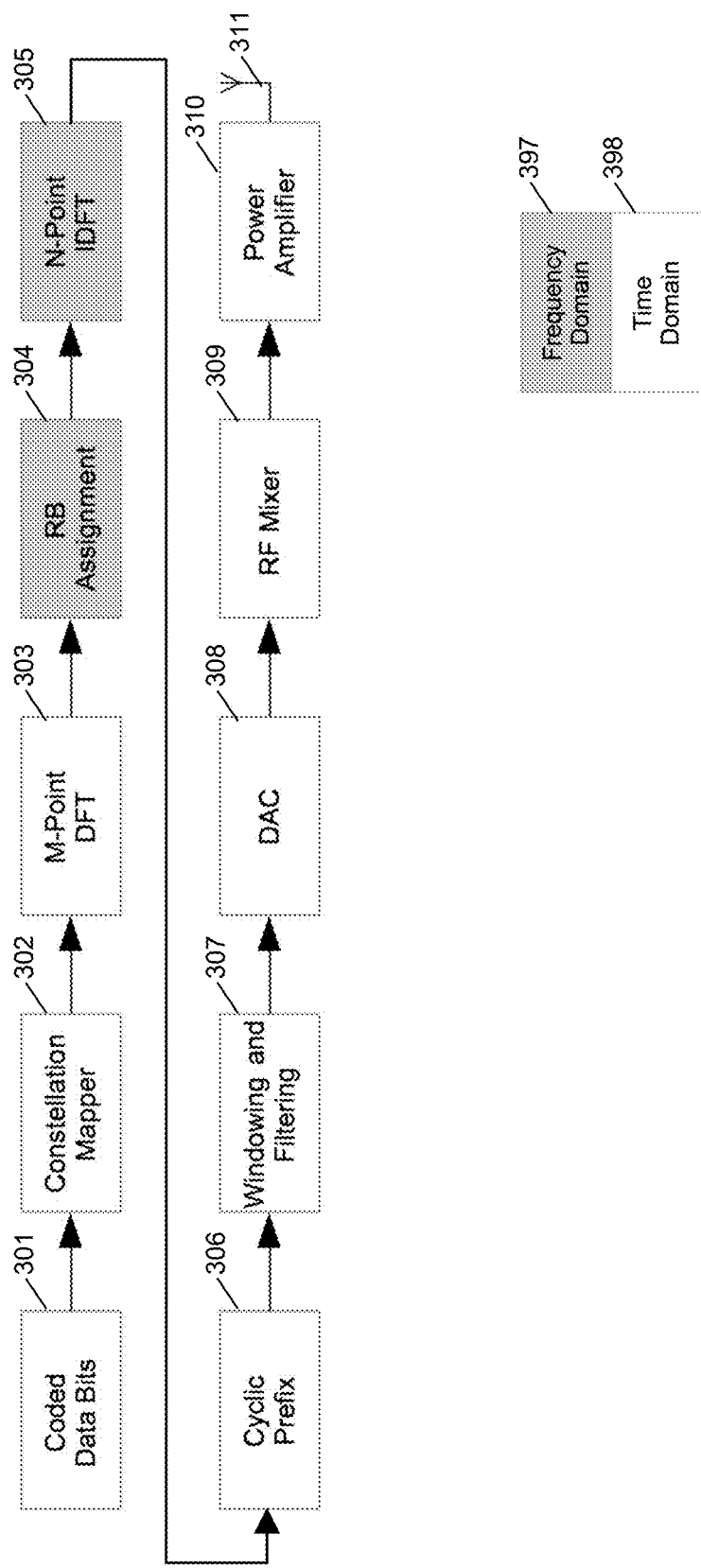
FIG. 3A is an SC-FDMA transmit chain diagram showing certain portions operating in the time domain and other portions operating in the frequency domain, in accordance with some embodiments.
Figure 3B:
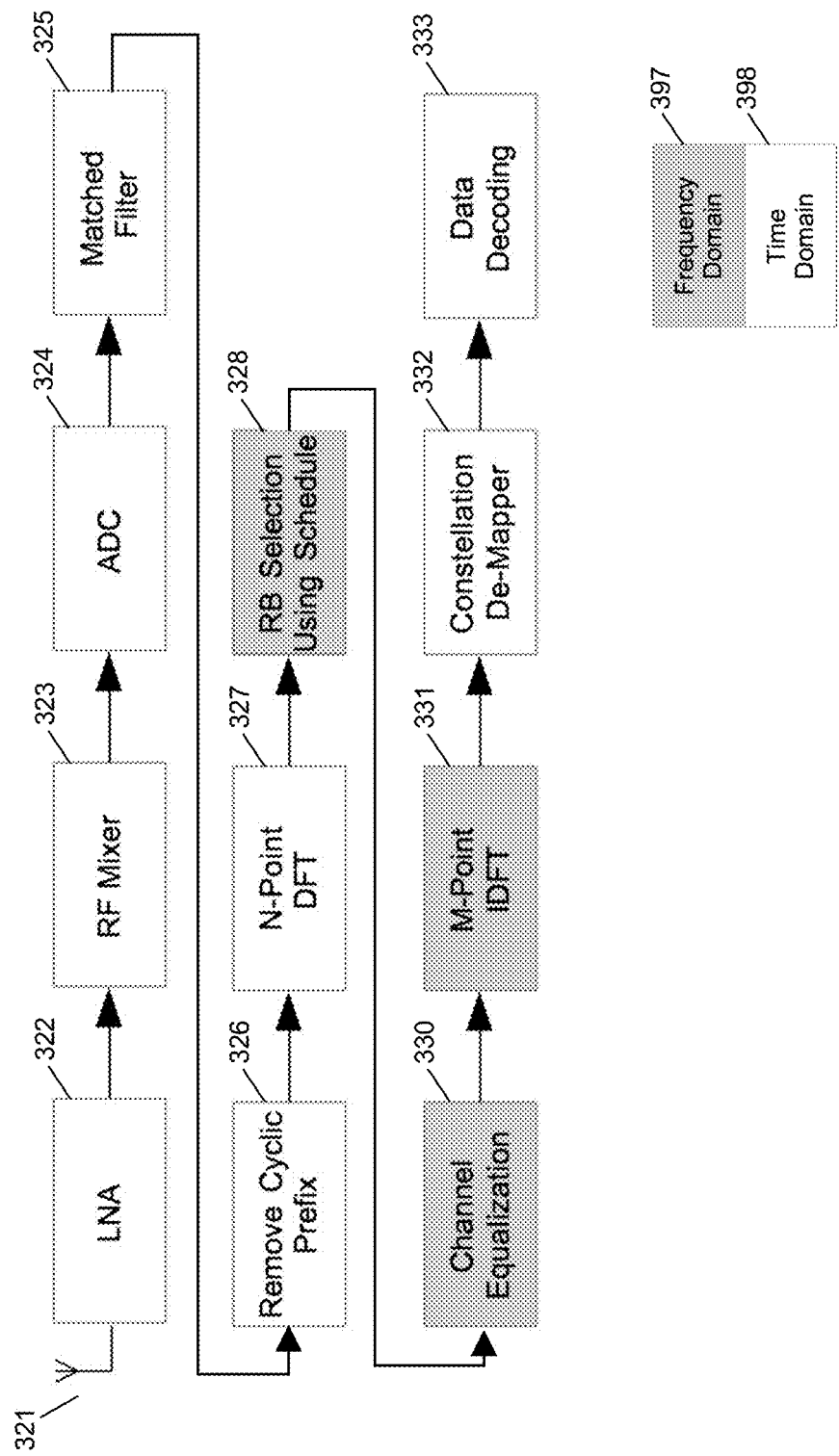
FIG. 3B is an SC-FDMA receive chain diagram showing certain portions operating in the time domain and other portions operating in the frequency domain, in accordance with some embodiments.

FIGS. 3A and 3B are example SC-FDMA transmit (FIG. 3A) and receive (FIG. 3B) chains highlighting whether components operate on time or frequency domain data. In LTE, M is the number of sub-carriers per RB which is 12 and N, depending on the Tx channel bandwidth, is either 128, 256, 512, 1024, 1536 or 2048.

FIG. 3A is an SC-FDMA transmit chain diagram showing certain portions operating in the time domain and other portions operating in the frequency domain, in accordance with some embodiments. Coded data bits arrive at block 301, entering constellation mapper 302, which feeds M-point DFT 303 to transform the time domain signal into a frequency domain signal. At block 304, resource block assignment occurs in the frequency domain using the frame schedule. At block 305, an N-point IDFT is performed to transform the signal back to a time domain signal. At block 306, cyclic prefixes are added, and at block 307, windowing and filtering is performed before entering into the digital to analog converter (DAC) 308. RF mixer 309 mixes the signal and power amplifier 310 amplifies the signal before transmission at antenna 311. Legends 397, 398 identify which portions operate in the frequency domain and which portions operate in the time domain, respectively.

Figure 4:
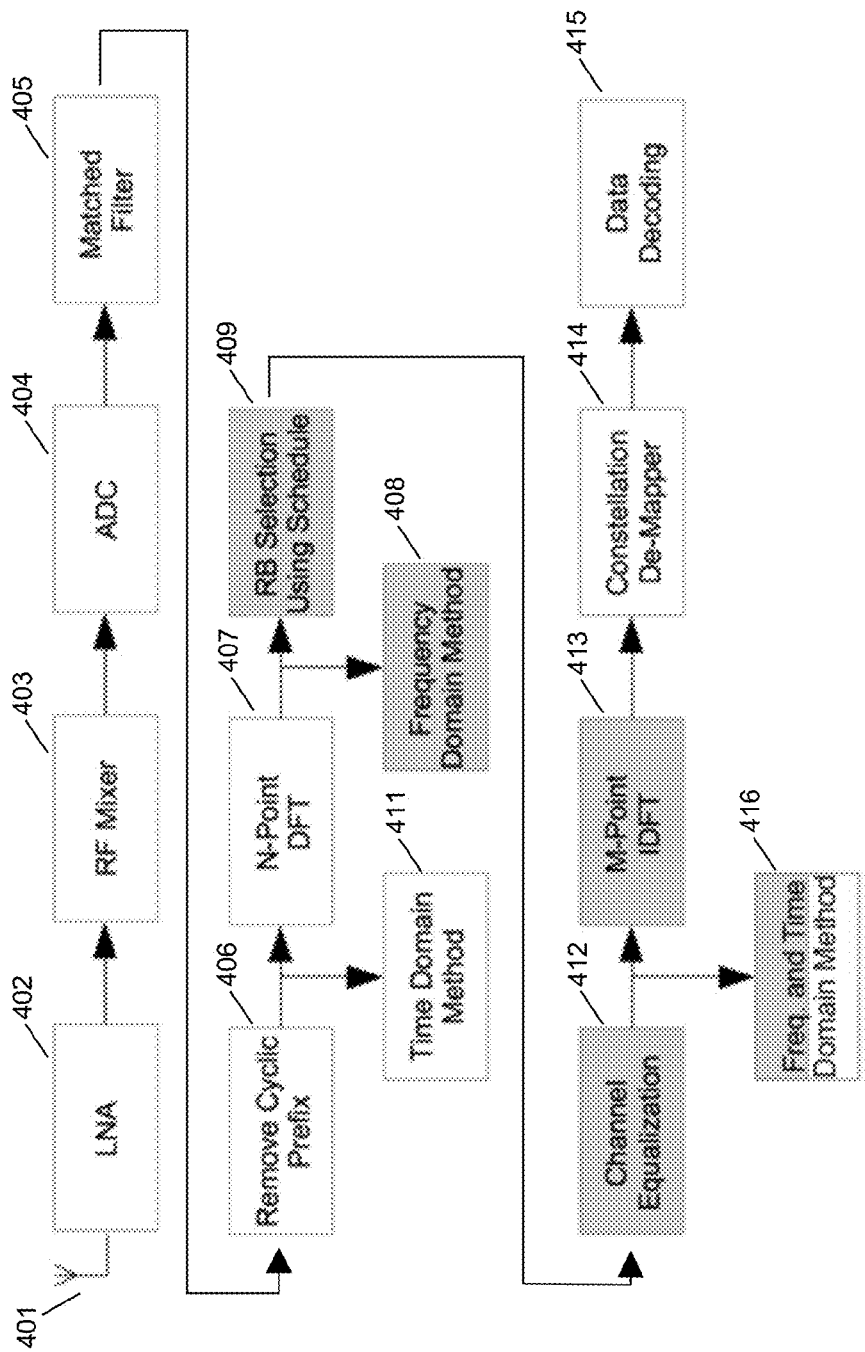
FIG. 4 is an SC-FDMA receive chain diagram showing frequency and phase offset processing, in accordance with some embodiments.

FIG. 3B is an SC-FDMA receive chain diagram showing certain portions operating in the time domain and other portions operating in the frequency domain, in accordance with some embodiments. A signal is received at antenna 321, in the time domain, and amplified by low noise amplifier (LNA) 322 before being fed into radio frequency (RF) mixer 323. The output of RF mixer 323 is fed into analog to digital converter (ADC) 324. The output of ADC 324 is fed into matched filter 325. The output of matched filter 325 is fed into module 326, which performs removal of the cyclic prefixes. An N-point discrete Fourier transform 327 is performed after the removal, transforming the output into the frequency domain. In the frequency domain, resource block selection is performed for a particular user at block 328, using a schedule such as the output of an LTE scheduler. Channel equalization 330 and an inverse discrete Fourier transform 331 follow, transforming the output back into the time domain. Constellation de-mapper module 332 performs demodulation, and further data decoding occurs at module 333. Legends 397, 398 identify which portions operate in the frequency domain and which portions operate in the time domain, respectively. FIG. 4 and its associated descriptive text provide further information pertaining to these modules.

High Precision Carrier Synchronization Algorithm

In some embodiments, the present disclosure takes advantage of the disclosed High-Precision Carrier Synchronization Technique that utilizes the modulated carrier signal power in a blind fashion to determine the frequency and phase offset present in an SC-FDMA signal, thereby eliminating the need for beacons or other markers which reduce data throughput. By utilizing the statistical nature of a quadrature signal, the present disclosure accurately measures the frequency shift in a received carrier signal, which results from a combination of the relative motion between the transmitter and receiver (Doppler shift) and frequency differences between their respective reference clocks.

FIG. 4 shows various components in the physical layer of an SC-FDMA receive chain, in accordance with certain embodiments. The methods described herein for frequency and phase offset correction can operate on data extracted from various points of the SC-FDMA Rx chain as shown in FIG. 4. These various methods use either time domain data (processed at step 411), frequency domain data (processed at step 408), or a mixture of the two (processed at step 416), and are described below. While it is not contemplated for all three methods to be used in the same embodiment, combination of features across embodiments is understood to be contemplated. FIG. 4 also shows location of where data may be extracted from the SC-FDMA Rx chain for processing by the disclosed frequency and phase offset estimation methods.

401 is an antenna.

402, LNA: The Low-noise amplifier (LNA) is usually the first component in a high performance radio receiver following the antenna, and increases the signal voltage without adding a significant amount of noise.

403, RF Mixer: The Radio Frequency (RF) mixer multiplies the incoming analog signal by a tone at the carrier frequency and a copy of the incoming analog signal by a tone lagging the first by $\pi/2$ to generate the in-phase (I) and quadrature (Q) components of the signal respectively.

404, ADC: The analog to digital converter (ADC) as shown here, first applies a low-pass filter to the I and Q analog components to reduce the effects of aliasing and then periodically samples the analog signal, quantizes the voltage level and outputs a digital representation of the analog signal.

405, Matched Filter: A matched filter such as the square root raised cosine filter may be employed in the SC-FDMA transmit and receive chains which together serve to minimize the effect of inter-symbol interference (ISI).

406, Remove Cyclic Prefix: The CP that was added in the transmitter to each symbol is discarded at this point.

411, Time domain method: If cancellation of offset is desired to be performed in the time domain, the partially-processed samples from the remove cyclic prefix 406 step may be used by the time domain method at this stage.

407, N-Point DFT: With the CP removed, the remaining N samples of the complex time domain symbol are passed through a discrete Fourier transform (DFT) to generate a frequency domain representation of this symbol. A Fast Fourier Transform (FFT) algorithm is often used to implement this process.

408, Frequency domain method: If cancellation of offset is desired to be performed in the frequency domain, the partially-processed samples from the N-Point DFT 407 may be used by the frequency domain method at this stage.

409, RB Selection Using Schedule: With the frequency domain representation of a signal and a knowledge of the channel schedule, an LTE BS is able at this point to separate the data that has been received from different users allowing for parallel processing. The remainder of the receive chain considers data from a single user.

412, Channel Equalization: To compensate for the effects of a non-AWGN transmission channel, the receiver can apply corrections to the received signal in the frequency domain, based on the effect that the channel has had on known reference signals sent by the transmitter.

416, Frequency and Time Domain Method: In some cases, a mixed frequency and time domain method may be used and data may be obtained from the signal path at this stage.

413, M-Point IDFT: The channel-corrected frequency domain data is converted back to the time domain using an inverse discrete Fourier transform, often implemented using an Inverse Fast Fourier Transform (IFFT) algorithm.

414, Constellation De-Mapper: Uses the magnitude and sign of a pair of I and Q time domain values to generate a modulation dependent numerical output.

415, Data Decoding: The numbers generated by the de-mapper are decoded using a known system, such as Turbo code decoding, in an attempt to detect and correct for errors introduced into the data by the transmission and reception process. Decoded data is then checked for consistency and passed to a higher layer in the receiver architecture.

Frequency Offset Estimation Method 1 (Time Domain Method) (Labeled 411 in FIG. 4)

In Method 1, the frequency offset is measured using the time domain data extracted from the Rx chain prior to the N-Point DFT and following removal of the CP. Filters are used to extract the contribution to the received signal from a single user. A number of variations exist for how this filtering may be implemented, of which two are shown below. In the first, a series of band-pass filters are used in conjunction with the uplink schedule to return the signal contribution from a single MS, colored red, as shown using the example resource grid in FIG. 5.

Figure 5:
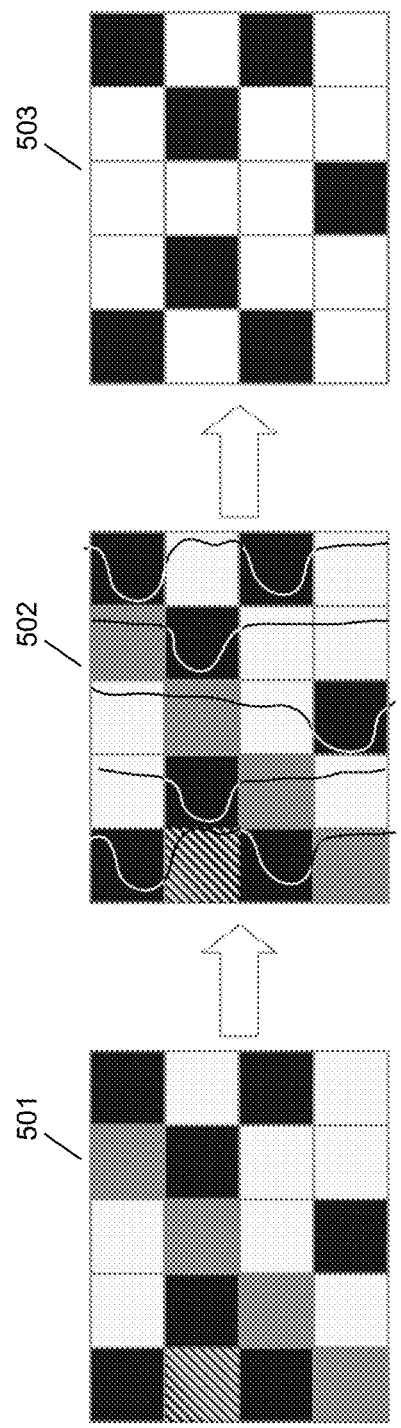
FIG. 5 is a schematic diagram showing extraction of a single UE's signal from a time domain SC-FDMA signal, in accordance with some embodiments.

FIG. 5 is a schematic diagram showing extraction of a single UE's signal from a time domain SC-FDMA signal, in accordance with some embodiments. The contribution to the received time domain SC-FDMA signal from a single user (Black) is extracted from a received signal by applying a series of band-pass filters. 501 shows an LTE frame gridded by time (x axis) and frequency (y axis). 502 shows frequency histograms of signals found within each timeslot from a particular user. The peak of transmissions from the single user appear in the black timeslots and frequency bands. 503 shows the isolation and identification of the black grid squares.

Figure 6:
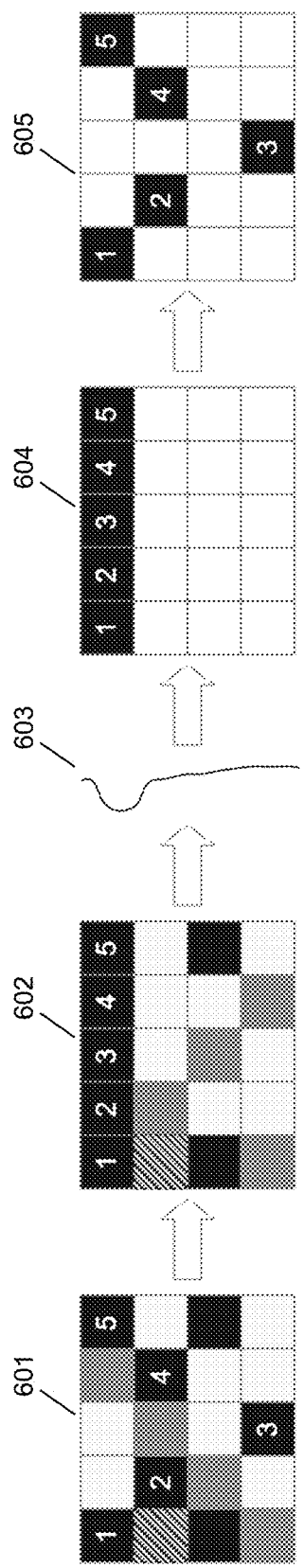
FIG. 6 is a schematic diagram showing extraction of a single UE's signal using an alternate time domain filtering technique, in accordance with some embodiments.

In a variation of Method 1, a similar result could be achieved by mixing each slot with a different shift frequency and then applying a single band-pass filter followed by the reverse shift, as in FIG. 6.

FIG. 6 is a schematic diagram showing extraction of a single UE's signal using an alternate time domain filtering technique, in accordance with some embodiments. 601 shows an LTE frame gridded by time (x axis) and frequency (y axis). 602 shows that, when a different shift frequency is mixed into the signals in each column, the frequencies of signals from the single UE (black) can be caused to line up in a particular time slot. 603 shows that a single frequency band pass filter may be used, instead of multiple such filters, once the signals have been lined up as in step 602. 604 shows isolation of the black grid squares. 605 shows identification of the black grid squares in the original LTE grid.

Notably, this variation of Method 1 only has one RB per time slot in the result, but it was found that the number of time slots was of greater significance on improving the quality of the offset estimation than the number of parallel RBs from a single user.

With the signal contributions from each user, these separate signals can now be processed to extract the frequency and phase offset information using the method described in Appendix A of U.S. Pat. No. 9,538,537 and [1]. So the time domain method can be summarized by the following procedure:

1. With a knowledge of the channel schedule collate the portions of the time domain signal using band-pass filtering that originate from a given user.

2. Apply known frequency and phase offsets to this time domain signal, which requires a knowledge of whether normal or extended CPs have been used (FIG. 2) to correctly infer the sample times.

3. Calculate the covariance between a function of the in-phase (I) and quadrature (Q) components of this time domain signal. Such a function could be the modulus function as discussed in [2].

4. Iterate steps 2 through 3, sweeping through the frequency offset range and phase range of 0 through $\pi/2$ until the global maximum of the correlation function is found to the required level of precision. This global maximum occurs at the frequency and phase offset of the received signal. Searching for the global maximum or minimum when using numerous functions of I and Q, such as the modulus, will return the same frequency offset with phases separated by $\pi/4$ as discussed in [1].

Note that although the data is shown as being extracted from the Rx chain following CP removal in FIG. 4, the CP could be discarded once the signal contributions are separated using the band-pass filtering described above. Discarding the CP reduces the impact of inter-symbol interference due to multi-path components in the transmission channel, and so improves the quality of the result.

Frequency Offset Estimation Method 2 (Frequency Domain) (Labeled 308 in FIG. 4)

Figure 7:
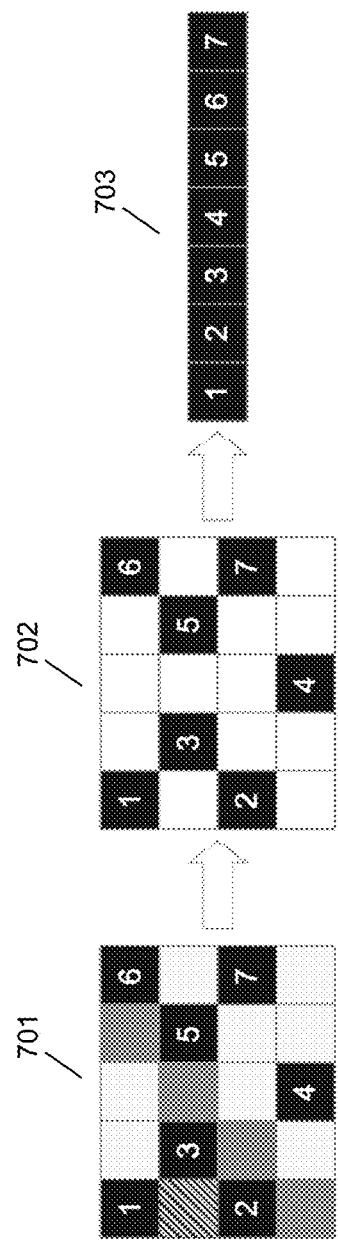
FIG. 7 is a schematic diagram showing extraction of a single UE's signal from a frequency domain signal, in accordance with some embodiments.

In Method 2, the SC-FDMA signal is treated in the same way as an OFDM signal and so the procedure could be applied at the MS end of the downlink channel to determine the frequency and phase offsets present in the OFDMA signal from the BS. Data is extracted from the Rx chain following the N-point DFT, as shown in FIG. 4, then using the channel schedule, the RBs for a particular user are selected (FIG. 7). These multiple RBs can be used together following frequency domain equalization to improve performance in a non-AWGN transmission channel.

FIG. 7 is a schematic diagram showing extraction of a single UE's signal from a frequency domain signal, in accordance with some embodiments. Selection of the RBs pertaining to a single user (Black) from the N-point frequency domain data is performed. At 701, an input LTE frame is shown. At 702, the signals are transformed into the frequency domain and identified as belonging to a particular UE. At 703, the signals can be reordered into their proper order.

The channel schedule gives the sub-carrier indices in the N-point frequency domain for the selected RBs which are numbered 1 through 7 in the example shown in FIG. 7; each RB has M sub-carriers (12 in the LTE uplink schedule) which will be 12 successive values in the range of $-N/2$ through $+(N/2)-1$. The total number of OFDM symbols available is given by the product of the number of RBs ($N_{RB}$) in the received signal and the number of symbols per time slot ($N_{SPS}$) which is 7 or 6 depending on whether normal or extended CPs are used, respectively. This information can be substituted into the method described in [3].

The frequency domain procedure can be summarized as follows and for the detailed information please refer to [2]:

1. Using the channel schedule select RBs corresponding to a single user from the N-point DFT data (FIG. 7).

2. Apply a frequency ($\varepsilon'$) and phase offset ($\varphi'$) to this sub-set of the frequency domain data.

3. Calculate the objective function J by summing across the available sub-carriers and symbols.

4. Sweep through the possible frequency and phase offsets and repeat steps 2-3 until a global maximum or minimum is found to the required level of precision. The global maximum will give the ideal frequency and phase offsets while the global minimum occurs at the same frequency as the global maximum but at a phase offset shifted by $\pi/4$ radians.

Frequency Offset Estimation Method 3 (Frequency and Time Domain) (Labeled 416 in FIG. 4)

In this third method, data is again extracted out from the SC-FDMA receive chain in the frequency domain (FIG. 4), and as with the frequency domain method, frequency and phase offsets are applied to the subset of the N-point DFT data. Following this an M-point IDFT is performed to transform this frequency domain data back to the time domain in a similar manner that the M-point IDFT is used in the SC FDMA Rx chain. A correlation based objective function of this time domain signal is then generated as described in [1] which when maximized (or minimized) will generate the correct frequency offset.

In procedural form:

1. Using the channel schedule select RBs corresponding to a single user from the N-point DFT data (FIG. 7).

2. Apply a frequency ($\varepsilon'$) and phase offset ($\varphi'$) to this sub-set of the frequency domain data.

3. Perform an M-point IDFT on this offset data.

4. Calculate the objective function S summing across the available time domain data.

5. Sweep through the possible frequency and phase offsets and repeat steps 2-4 until a global maximum or minimum is found to the required level of precision. The global maximum will give the ideal frequency and phase offsets while the global minimum occurs at the same frequency as the global maximum but at a phase offset shifted by $\pi/4$ radians.

Figure 8:
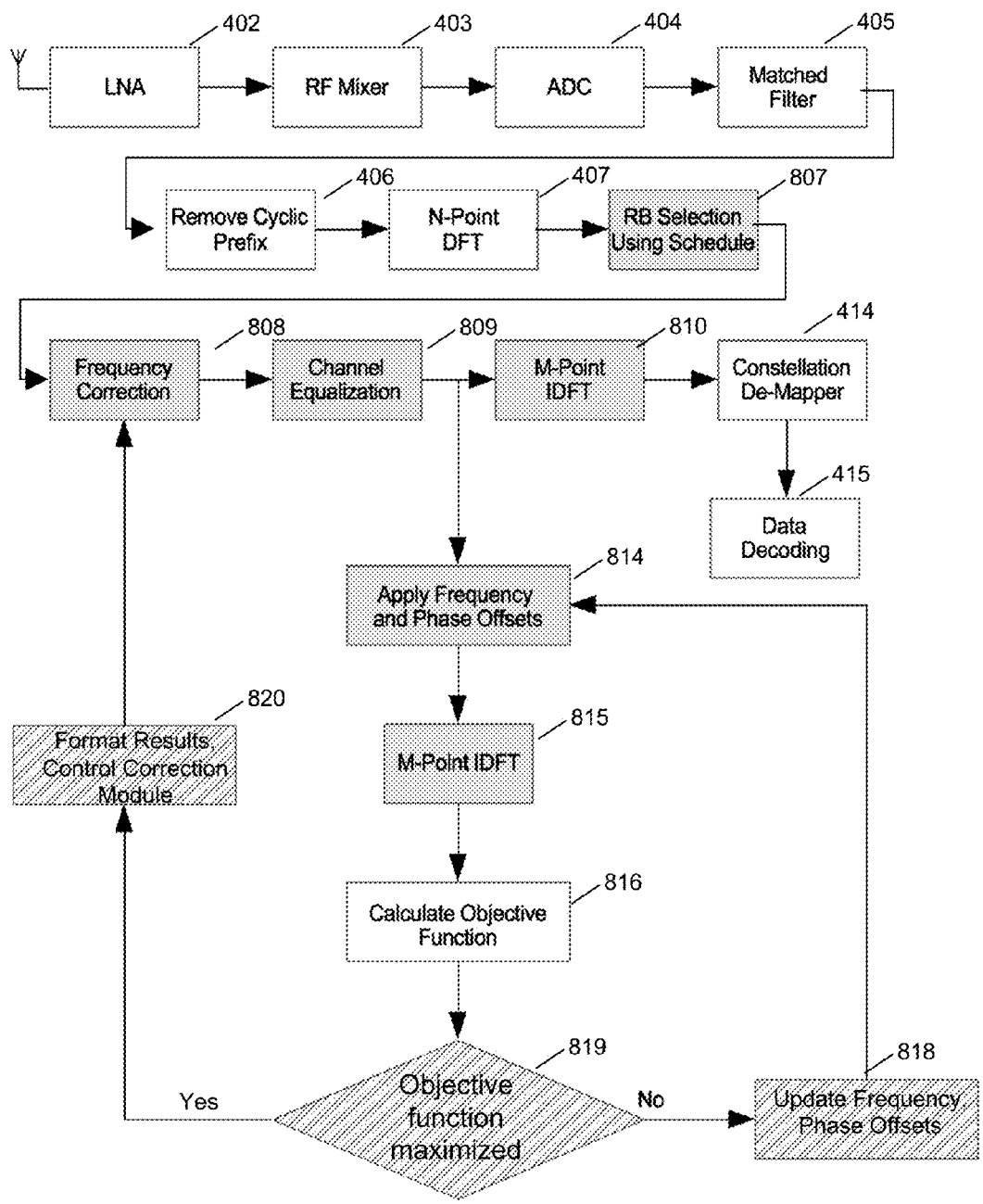
FIG. 8 is a flowchart/block diagram showing an SC-FDMA receive chain with frequency and phase offset correction, including an M-point IDFT inside a search loop.

A way in which this correction could be incorporated into the Rx chain is shown in FIG. 8. FIG. 8 is a flowchart/block diagram showing an SC-FDMA receive chain with frequency and phase offset correction, in accordance with some embodiments. The SC-FDMA receive chain showing the location of the data tap-out, and processing, for the frequency and time domain methods described herein, and where the correction may be implemented. Where figure identifiers are identical to those shown in other figures described herein, the same or equivalent modules are intended to be shown.

807 RB Selection Using Schedule: Selects resource blocks from the input that apply to or are transmitted from a particular UE.

808 Frequency Correction module: Performs frequency correction.

809 Channel Equalization: Performs equalization of channels.

810: M-point IDFT. This IDFT is always outside of any frequency and phase error processing loop, as it is required to provide a time domain signal to the constellation demapper 414.

814 Apply Frequency and Phase Offsets: Based on the time at which a given symbol was received a phase offset is applied to the samples.

815 M-Point DFT: This transforms the frequency and phase offset received data to the time domain.

816 Calculate Objective Function: With this time domain data, the correlation objective function is calculated.

819 Objective function maximized?: A binary search or another search may be performed to efficiently locate the global maximum to the required level of precision. In some embodiments a coarse initial search may be followed by a fine search.

818 Update Frequency and Phase Offsets: Decides which values to use for the frequency and phase offsets in the next iteration of the search, depending on the search progress.

820 Control Frequency Correction: When the frequency and phase offsets generating the global maximum of the objective function have been determined to the required level of precision, these are sent to the frequency correction module 808 and used to fine tune the received signal from a given user.

These new methods use the same radio hardware found in typical communications networks and the digital domain processing can be directly implemented in equipment supporting the LTE standard for example:

In a downlink channel, the OFDM method can be implemented in the MS receiver.

In an uplink channel, the methods described above, such as the hybrid frequency-time domain method described herein, can be implemented in the BS receiver.

Due to their ability to use any form of quadrature modulated data they are not dependent on training signals, pilots or beacons for example and can use regular payload data as well as equalization signals such as the DRS in LTE.

How measurements are performed can be adjusted based on the environment, for example the MS speed relative to the BS; when both are stationary, data from multiple time slots can be aggregated to increase the accuracy of frequency offset. When a mobile station is moving fast, shorter amounts of data can be used to estimate frequency offset including Doppler Shift with only slight degradation. Even in the case of large Doppler Shifts, our method is much more accurate than MS-only synchronization and allows higher data throughput at higher speeds or increased service availability in the cell range.

The frequency offset of multiple users can be extracted from the same received signal by an LTE BS and correcting for this can allow individual users to employ higher data rates and improve system data throughput and bandwidth efficiency.

Now that the CFO/SFO offset has been determined and extracted, it is necessary to apply the correction to an input signal. A proposed method for CFO/SFO correction for LTE uplink follows.

Background of CFO/SFO correction methods

It is noted that, in typical OFDM systems, CFO produces the same phase drift at all subcarrier indexes, while SFO introduces a phase rotation which increases linearly with the subcarrier index. The impact of CFO and SFO are the loss of the orthogonality of the subcarrier, which results in inter-carrier interference (ICI) and the rotation of constellation points. To mitigate the impact of CFO and SFO, a two-step process is normally performed. 1) Estimation of CFO and SFO; 2) Correction of CFO and SFO based on the estimation.

There are three major methods for CFO/SFO estimation [3]:

The first method is cyclic prefix (CP)-based estimation. The performance of this method relies on the length of CP and the delay spread of multipath channel.

The second is the pilot-based method. Pilot signals can be inserted at the beginning of each data frame or scattered within data frame. The problem with this method is that, because the pilot signals are just a small portion of the symbol, it always takes several tens of OFDM symbols for the tracking loop to converge.

The third is the decision-directed (DD) method. One problem of this method is that when SFO is large, the hard decisions are not reliable, so the decisions can be obtained only by decoding and re-constructing the symbol, which requires more memory and computation complexity.

Turning to the second step of correction, generally speaking, there are two methods for CFO/SFO correction.

The first method is interpolation/decimation. The CFO/SFO is corrected by resampling the baseband signal in the time domain. The problem of this method is that the complexity is too high for high-speed broadband applications.

The second method is to rotate the constellations in the frequency domain. The basis for this method is mentioned above, that is, the CFO/SFO in the time domain causes phase shifts that are linearly proportional to the subcarrier index in the frequency domain. The advantage of this phase rotation method is its low complexity. However, the performance of such method relies on the accuracy of CFO/SFO estimation. This statement is also true for any correction method.

Below is a brief summary of the above techniques, and of techniques published so far on CFO/SFO estimation and correction:

1. All the estimation methods are based on some information or property of an OFDM signal, such as preambles or pilot symbols.

2. The accuracy of these estimation methods is around 100 ppb to 1 ppm level for moderate SNR values [4]. This kind of accuracy may be fine for the applications with relatively short data frames, but their effectiveness will be limited to supporting higher order modulation with long data frames, as shown in FIG. 2. These methods certainly will be more severely challenged on systems with 256-QAM and data length of 65,535 octets in the IEEE 802.11n standard and 1,048,575 octets in the IEEE 802.11ac standard.

3. It is fundamentally difficult challenge to achieve a high accuracy of CFO/SFO estimation and at the same time to maintain an acceptable level of complexity for CFO/SFO correction in a high data rate OFDM communication system.

However, with the method disclosed above, the CFO/SFO estimation error can be reduced to single digits of ppb in a realistic application environment. This makes error correction in a high data throughput OFDM system more feasible in a variety of applications. Furthermore, if the communication network is first synchronized, such that the resultant CFO/SFO between users is small enough, there will be no need for CFO and CFO estimation and correction at the receiver side. This can further reduce the complexity of receiver design for OFDM systems.

In some embodiments, the HPCST method can be used for frequency offset estimation in LTE uplink systems within one sub-frame period of 1 ms. The frequency offset estimated at time of k sub-frame can be applied for the frequency offset correction for the data received at time of k+1 sub-frame. A description of the detailed procedure for the time domain correction of CFO and frequency domain correction of SFO follows.

Figure 9:
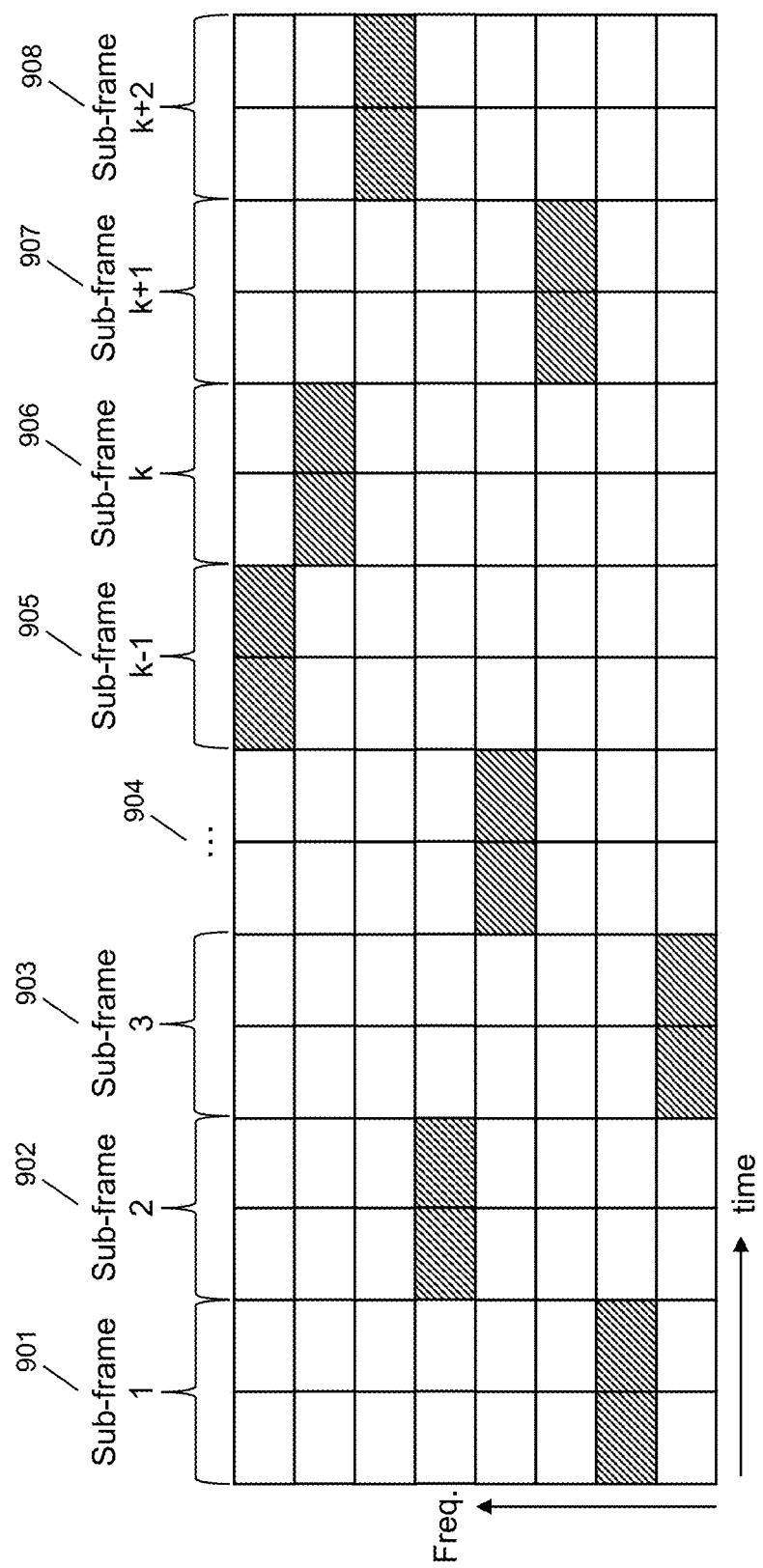
FIG. 9 is a schematic diagram showing a resource assignment of one user in both time and frequency, in accordance with some embodiments.

FIG. 9 shows the resource assignment of one user in both time and frequency, in accordance with some embodiments. A graph of frequency versus time is shown, with each resource block shown as a block. One sub-frame includes two resource blocks. Sub-frames 901, 902, 903, 905, 906, 907, 908 are present in a frame; notation 904 indicates sub-frames not shown. An LTE frame is typically 10 ms long and has a particular fixed number of sub-frames, i.e., 10 sub-frames per frame. As shown in FIG. 9, a single user's frames are shown in hatched gray; the figure shows that the user is normally assigned with one sub-frame a time. This guarantees that there are two references in each sub-frame, which can be used for the CFO/SFO estimation in the conventional method.

Figure 10:
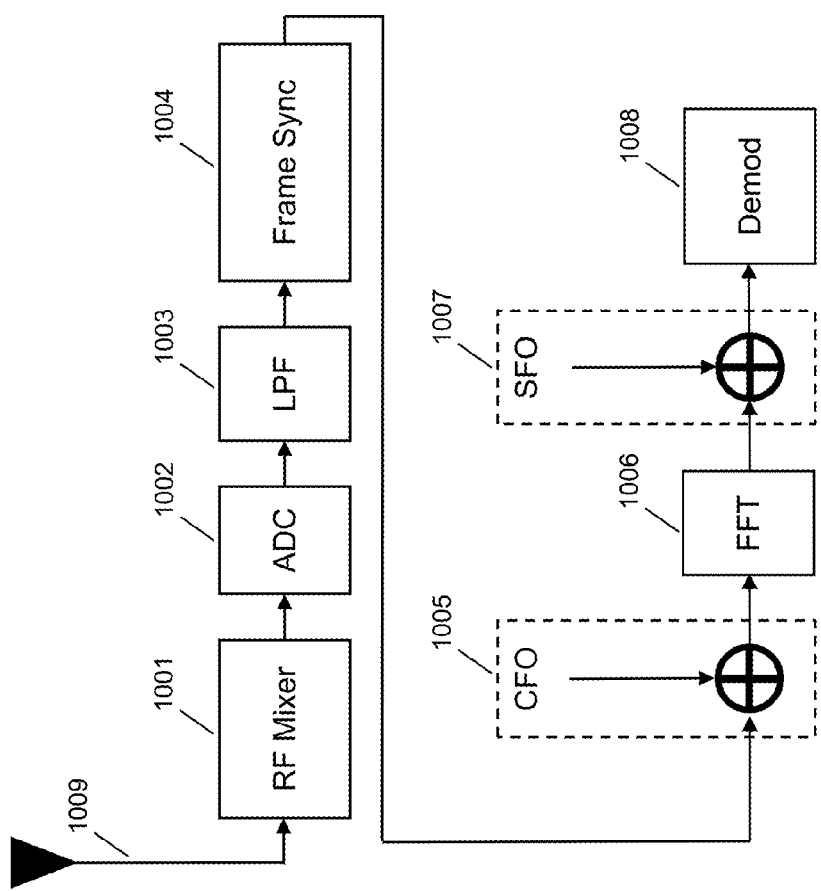
FIG. 10 is an OFDM receiver block diagram showing offset correction, in accordance with some embodiments.

FIG. 10 shows CFO correction in time and SFO correction in frequency for an LTE uplink system, in accordance with some embodiments. RF mixer 1001 receives signal samples from an antenna 1009 in the time domain; ADC 1002 digitizes those samples; low pass filter 1003 is used to identify frames specific to an individual user; frame sync 1004 determines the beginning of the LTE frame. Next, a CFO correction module 1005, including at least an input carrying a CFO correction signal and a mixer, is used to apply CFO correction in the time domain. Next, an FFT 1006 is performed to transform the signal to the frequency domain. Next, an SFO correction module 1007, including at least an input carrying an SFO correction signal and a mixer, is used to apply SFO correction in the frequency domain. Demodulation follows at demodulator 1008. As shown in FIG. 10, in embodiments of the present disclosure, the CFO is corrected before the FFT and SFO is corrected after the FFT. In the next section, the simulation will show the performance improved with our method vs. the conventional method of performing both CFO/SFO corrections in the frequency domain.

Figure 11:
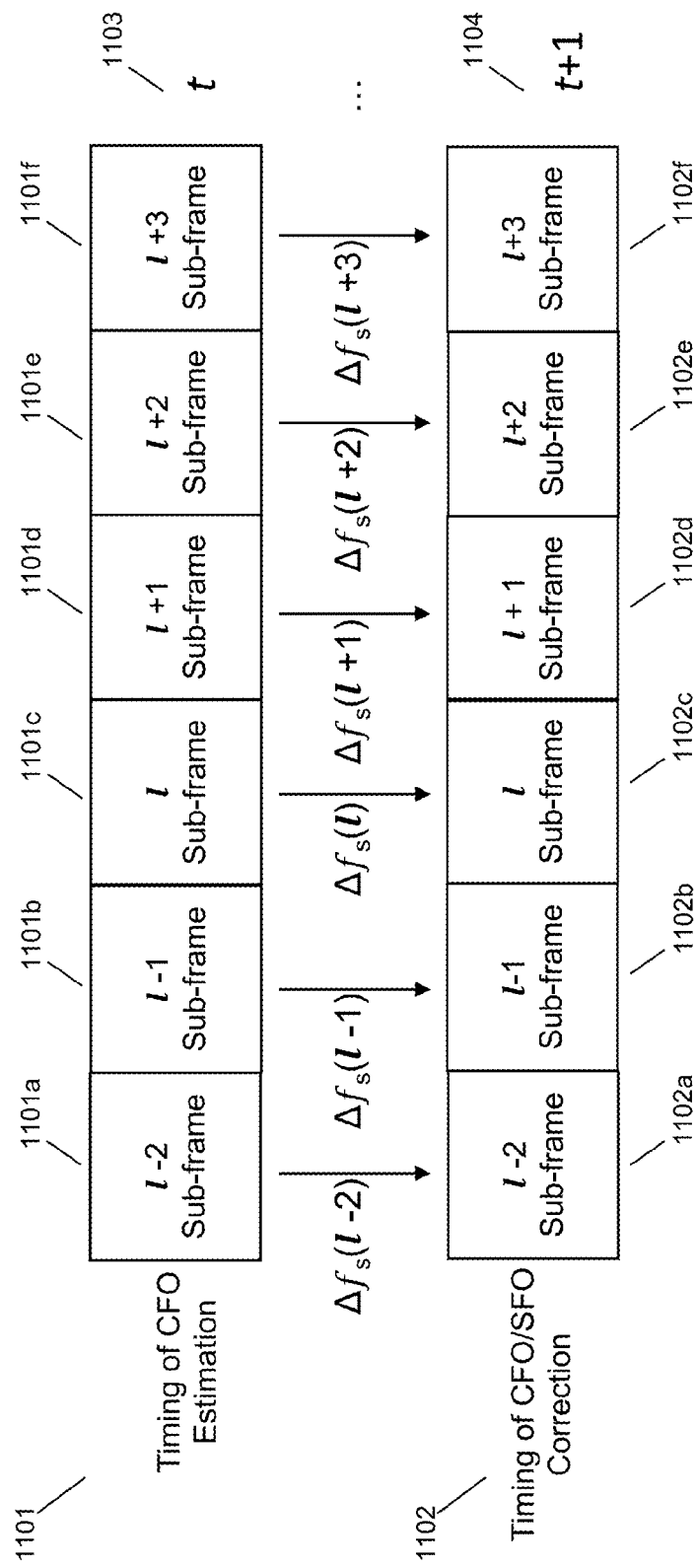
FIG. 11 is a schematic diagram of sub-frame timing for obtaining and applying offset correction, in accordance with some embodiments.

FIG. 11 shows CFO correction over two frames, in accordance with some embodiments. The CFO estimated during the sub-frame t period, 1103, with the OFDM HPCS algorithm can be used to correct the CFO in time domain and SFO in the frequency domain for the data received during the sub-frame t+1 period, 1104. Two frames 1101 and 1102 are shown. Frame 1101 is received during period 1103 and is called the prior frame. Frame 1102 is received during period 1104, e.g., t+1, and is called the subsequent frame. Estimation of CFO happens during prior frame 1101 for a particular user's frames. Correction of CFO happens during subsequent frame 1102 and period 1104 for the particular user's frames. Correction of SFO may also happen during frame 1102 and period 1104, in some embodiments. The frame size may be any size and the frames shown in FIG. 11 are merely schematic; for example, LTE frames with 10 sub-frames each may be used, in some embodiments.

Each frame has the same length and the same number of sub-frames. In some embodiments, the sub-frame having the same position (or time index) in the prior frame is used to generate the CFO estimate for correction of the sub-frame having the same position (or time index) in a subsequent frame, such as the immediately following frame.

As shown, sub-frame 1101a is used to generate the CFO estimate that is used to correct the CFO of sub-frame 1102a; sub-frame 1101a is used to generate the CFO estimate that is used to correct the CFO of sub-frame 1102a; sub-frame 1101b is used to generate the CFO estimate that is used to correct the CFO of sub-frame 1102b; sub-frame 1101c is used to generate the CFO estimate that is used to correct the CFO of sub-frame 1102c; sub-frame 1101d is used to generate the CFO estimate that is used to correct the CFO of sub-frame 1102d; sub-frame 1101e is used to generate the CFO estimate that is used to correct the CFO of sub-frame 1102e; sub-frame 1101f is used to generate the CFO estimate that is used to correct the CFO of sub-frame 1102f; and so on.

In other embodiments, a CFO estimate can be obtained for any sub-frame prior to the current frame, and CFO can be corrected thereby in the current frame. In other embodiments, one, or a plurality, or CFO estimates can be obtained during the preceding frame, and that one estimate or plurality of estimates can be reused as necessary to apply CFO correction to any subsequent frame/sub-frame. Another user's CFO estimate may be used. Various other combinations may be contemplated, with the logical caveat that correction must follow estimation, and that estimation must occur on a prior sub-frame.

The advantages of the present system include speed and low complexity in some embodiments, enabling the estimation and correction of CFO within a single frame delay. This is not possible with the reference method because the reference method requires an FFT to be performed to extract the per-user reference signal. Even given sufficiently high-performing baseband hardware, the use of the reference method would require correction in the frequency domain, or the use of an expensive inverse FFT to perform correction in the time domain. Further, the reference method has such low accuracy that a per-frame application of this method may not be useful or efficient.

In some embodiments, lengthier delays between the offset estimation frame and the correction application frame are contemplated, for example in case of less processing power being available. In some embodiments, correction may only be performed when an estimated offset for a particular user is available.

Here is a mathematical description showing CFO correction in the time domain and SFO correction in the frequency domain:

In the presence of a CFO of $\Delta f_s$ and a SFO of $\varepsilon_s$, the time domain samples $r_l(k)$ is given by:

$$r_l(k) = \sum_{i=0}^{N-1} d_i e^{j2\pi(i+\Delta f_s(l))k(1+\varepsilon_s(l))/N}; k=0,1,\ldots,N-1 \quad (1)$$

Where l represents sub-frame index, $\Delta f_s(l)$ represents relative frequency offset normalized by fs/N, $\varepsilon_s(l)$ represents the relative sampling frequency error $$\varepsilon_s = \frac{\Delta f_s(l)}{N},$$

and fs is the sampling frequency. For the simplicity, here it assumes that both CFO and SFO stem from same the frequency source error. The method presented in this document can be easily extended to the case that both CFO and SFO are independent.

By assuming that $\Delta f_s(l)\varepsilon_s(l) \approx 0$ and $\Delta f_s(l) \approx \Delta f_s(l-1)$, applying the CFO correction in equation (1), we have:

$$r_l(k)e^{-j2\pi k \Delta f_s(l-1)/N} = \sum_{i=0}^{N-1} d_i e^{\frac{j2\pi i k(1+\varepsilon_s(l))}{N}} \quad (2)$$

$$k = 0, 1, \ldots, N-1$$

Equation (2) shows that the impact of CFO has been removed from the time domain signal.

Applying FFT for the signal in equation (2) and omitting the noise and ICI, we see that:

$$R_l(m) = e^{-j\pi \frac{N-1}{N} m \varepsilon_s(l)} \frac{\sin(\pi m \varepsilon_s(l))}{\sin\left(\frac{\pi m \varepsilon_s(l)}{N}\right)} d_m \quad (3)$$

Following SFO correction, the frequency domain samples are described by the equation:

$$R_l(m)e^{j\pi\frac{N-1}{N}m\varepsilon_s(l-1)} = \frac{\sin(\pi m\varepsilon_s(l))}{\sin\left(\frac{\pi m\varepsilon_s(l)}{N}\right)}d_m \quad (4)$$

The amplitude part of $d_m$ can be recovered with a frequency domain equalizer. $\varepsilon_s$ is a relatively small magnitude of remaining error.

Applications

In general, there are at least three applications of the disclosed systems and methods for CFO/SFO correction in OFDM systems, in some embodiments.

1. If both sides of the transmitter and receiver can apply the OFDM HCPS algorithm, the system is synchronized and both sides share the same frequency. In this case, there is no need for any CFO and SFO estimation or correction algorithm at the receiver.

2. If a user at the receiver cannot synchronize frequency with the transmitter, the receiver can still accurately estimate the frequency offset with the disclosed HCPS algorithm.

3. In case of one single user transmitting and receiving at any given time, such as in an IEEE 802.11 Wi-Fi system, our method can be applied directly, that is, the CFO can be corrected in the time domain and SFO can be corrected in the frequency domain. In case of a multi-user environment where only the signal of a single user needs to be detected, as with the LTE downlink system, our method also can be applied directly as well.

In case of multi-user applications, such as the LTE uplink, in some embodiments we can select a subset of dominant users, such as users with high data rate or users with larger frequency offsets, and apply CFO correction in the time domain and SFO correction in the frequency domain to the dominant users (and not to other users). In this case, the complexity is slightly increased due to multiple FFTs being used for the selected users. However, an error vector magnitude (EVM) gain is achieved as presented in TABLE 1 for the selected users.

When selecting specific users for CFO correction, we select the users that will be most improved by correcting their frequency offset. Other users will not be affected and we do not expect the carrier frequency offset of different users to be related. Although in some cases multiple users could have similar frequency offsets—e.g. for users attached to a base station next to a highway, multiple users would have similar Doppler shifts, and their similar frequency offsets could be corrected using a heuristic algorithm without individually estimating their CFO.

Correcting individual users' frequency offsets would require more processing (parallel FFTs) but has the benefit of increased gain as described herein. If processing power was not a limitation then all of the users could be corrected, but in a real system some sort of compromise is typically necessary, hence the idea of picking certain "dominant" users that occupy the most bandwidth and/or are using the highest data rates.

Since Phasorlab's OFDM HCPC algorithm can track the frequency variation due to the Doppler frequency caused by high speed mobile user, the present method is very suitable for the LTE outdoor environment, where the maximum Doppler frequency defined in LTE is about 900 Hz.

Performance

It has been widely adopted in certain systems, such as in Wi-Fi systems, for CFO to be corrected in the time domain and SFO to be corrected in the frequency domain. In theory, both can be corrected in the frequency domain. However, the conventional method for CFO correction in the time domain cannot be applied to the LTE uplink system due to the fact that the CFO can only be estimated in the frequency domain in the conventional method based on a reference signal. At LTE uplink, the signal received is a composition of multiple users' signals, and the reference signal associated with each user is embedded in the specific subcarriers for that user. Thus, correction of CFO in the frequency domain is performed. This results in distortion of the orthogonality between subcarriers, creating inter-carrier interference (ICI), which behaves like background noise and cannot be removed by simple frequency domain equalizers (FDEs).

Thus, CFO correction using the conventional method is performed in the frequency domain, leading to link-degrading ICI or requiring sophisticated multi-tap FDEs.

Although SFO can be corrected in the time domain using an interpolation filter, as mentioned the problem with this method is that the complexity is too high for high-speed broadband applications. Furthermore, due to the poor accuracy of conventional frequency offset estimation, the SFO cannot be removed adequately, and the residual SFO must be re-corrected in the frequency domain based on pilot subcarriers.

In brief, to avoid the ICI introduced by CFO, it is ideally corrected in the time domain. For phase rotation caused by the SFO, it is ideally corrected in the frequency domain.

Figure 12:
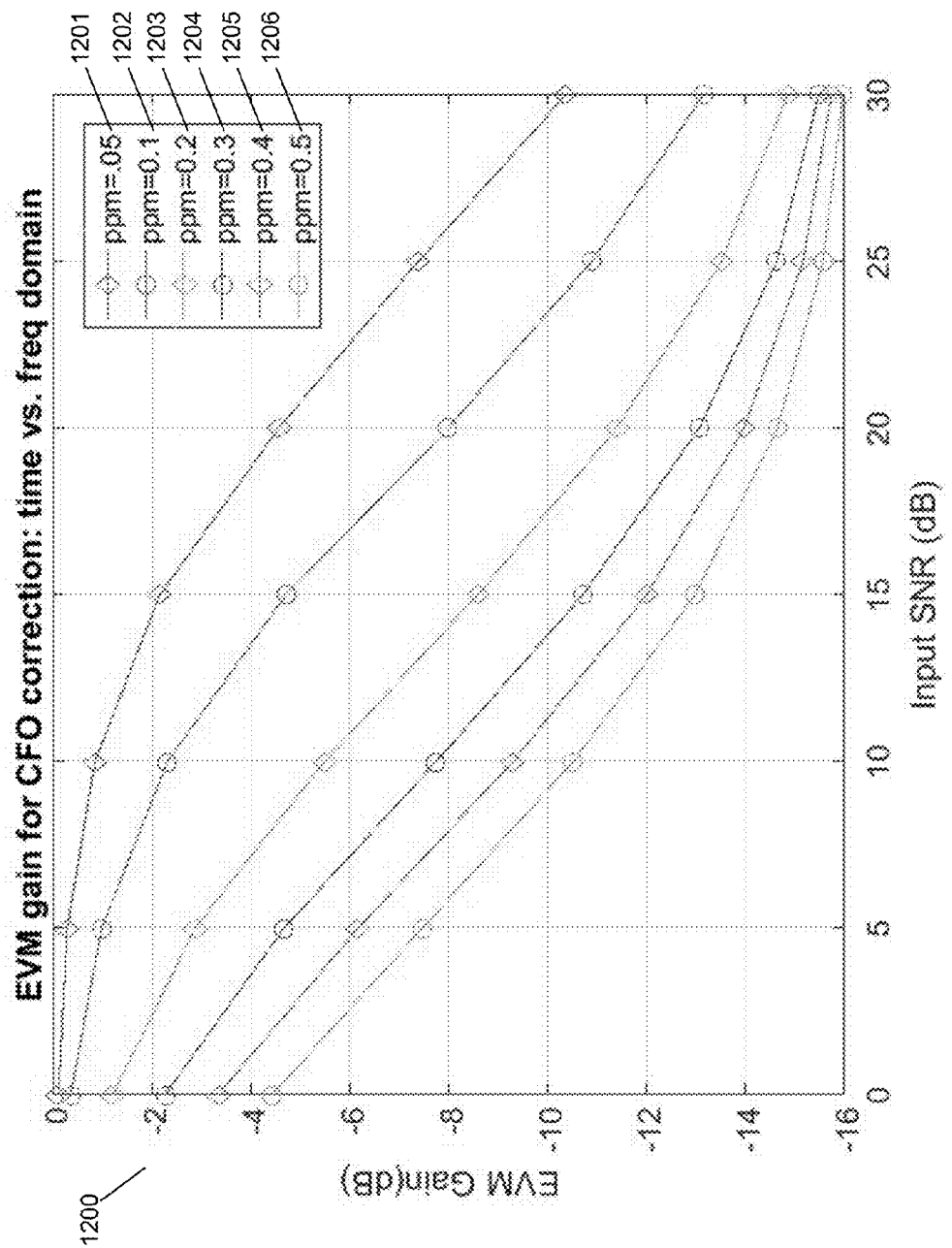
FIG. 12 is a plot showing EVM gain achieved versus a conventional method in which CFO/SFO are both corrected in the frequency domain, in accordance with some embodiments.

FIG. 12 shows the simulation result of EVM gain achieved in some embodiments, by comparing our method versus the conventional method that corrects both CFO and SFO in frequency domain. Plot 1200 shows EVM gain plotted against different CFO corrections, performed in the time domain. The legend shows different simulated CFO errors 1201, 1202, 1203, 1204, 1205, 1206 in parts per million. EVM gain roughly correlates to signal to noise ratio (SNR) and SNR is understood to be described herein where the word EVM is used.

The LTE uplink system as shown in FIG. 3 is simulated. It is assuming that each user occupies 12 subcarriers, each slot (0.5 ms) has 7 OFDM symbols. The frequency assignment for a given time is hopping around. The random bin assignment is applying to the user and hop from one spectrum assignment to another based on 1 ms interval. As defined in LTE, the middle OFDM symbol of each slot is used as reference signal for the channel estimation.

Table 1: EVM gain of the CFO correction in time domain vs. correction in frequency domain

TABLE 1

| Input SNR | Frequency Offset Error (ppm) | | | | | |
|---|---|---|---|---|---|---|
| (dB) | 0.05 | 0.1 | 0.2 | 0.3 | 0.4 | 0.5 |
| 0 | −0.0868 | −0.3359 | −1.1837 | −2.2412 | −3.3163 | −4.4146 |
| 5 | −0.2639 | −0.9597 | −2.8508 | −4.6524 | −6.1478 | −7.4508 |
| 10 | −0.8264 | −2.2921 | −5.4689 | −7.7307 | −9.2844 | −10.5071 |

TABLE 1-continued

| Input SNR (dB) | Frequency Offset Error (ppm) | | | | | |
|---|---|---|---|---|---|---|
| | 0.05 | 0.1 | 0.2 | 0.3 | 0.4 | 0.5 |
| 15 | −2.1357 | −4.6907 | −8.5739 | −10.7007 | −11.9908 | −12.9671 |
| 20 | −4.5420 | −7.9693 | −11.3808 | −13.0545 | −13.9613 | −14.6402 |
| 25 | −7.3609 | −10.8723 | −13.5016 | −14.6280 | −15.1588 | −15.5659 |
| 30 | −10.3509 | −13.1403 | −14.8452 | −15.4773 | −15.7322 | −15.9708 |

The results show in Table 1 that the EVM gain increases with increase of the SNR for the given frequency offset error. The EVM gain is flat at high frequency offset due to the fact that the ICI is a domain noise floor regardless the input SNR levels. For the given SNR, the EVM gain increases with increase of the frequency offset error. The larger the frequency offset, the larger the ICI introduced in the frequency domain. The significant EVM gains are achieved with larger frequency offset and high SNR.

From the foregoing, it will be clear that the present invention has been shown and described with reference to certain embodiments that merely exemplify the broader invention revealed herein. Certainly, those skilled in the art can conceive of alternative embodiments. For instance, those with the major features of the invention in mind could craft embodiments that incorporate one or major features while not incorporating all aspects of the foregoing exemplary embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for canceling carrier frequency offset (CFO) and sampling frequency offset (SFO) in a radio receive chain, comprising:
   receiving a sub-frame via a radio receive chain in a time domain;
   performing per-user filtering on the sub-frame to obtain a signal for a particular user;
   obtaining a CFO correction signal;
   adding the CFO correction signal in the time domain to perform a CFO correction step on the signal for the particular user;
   performing an FFT on an output of the CFO correction step to obtain samples in a frequency domain;
   adding an SFO correction signal in the frequency domain to perform an SFO correction step on an output of the FFT;
   demodulating an output of the SFO correction step; and
   identifying dominant users and performing the CFO correction step for each of the dominant users,
   wherein the dominant users are users with a high data rate or users with larger frequency offsets,
   thereby performing CFO and SFO correction while reducing inter-carrier interference (ICI).

2. The method of claim 1, wherein the sub-frame is a Long-Term Evolution (LTE) single-carrier frequency division multiple access (SC-FDMA) uplink frame.

3. The method of claim 1, further comprising determining the CFO correction signal based on a prior sub-frame within a prior frame.

4. A method for canceling carrier frequency offset (CFO) and sampling frequency offset (SFO) in a radio receive chain, comprising:
   receiving a sub-frame via a radio receive chain in a time domain;
   performing per-user filtering on the sub-frame to obtain a signal for a particular user;
   determining a CFO correction signal based on a prior sub-frame within a prior frame immediately prior to the received frame, the prior sub-frame having a sub-frame time index equal to a sub-frame time index of the sub-frame, with a sub-frame duration of 1 ms;
   adding the CFO correction signal in the time domain to perform a CFO correction step on the signal for the particular user;
   performing an FFT on an output of the CFO correction step to obtain samples in a frequency domain;
   adding an SFO correction signal in the frequency domain to perform an SFO correction step on an output of the FFT; and
   demodulating an output of the SFO correction step;
   thereby performing CFO and SFO correction while reducing inter-carrier interference (ICI).

5. The method of claim 1, further comprising performing CFO correction steps for each sub-frame using a CFO correction signal based on a prior sub-frame within an immediately prior frame.

6. The method of claim 1, wherein obtaining the CFO correction signal further comprises obtaining the CFO correction signal for the particular user from a prior sub-frame.

7. The method of claim 1, further comprising obtaining the CFO correction signal based on a time domain, a frequency domain, or a frequency and time domain method.

8. The method of claim 1, further comprising obtaining the CFO correction signal without a preamble or pilot symbol.

9. The method of claim 1, further comprising obtaining the CFO correction signal with an accuracy of estimation of between 1 ppb and 10 ppb.

10. The method of claim 1, further comprising performing CFO correction at both a transmitter and a receiver, thereby enabling a synchronized transmitter and a synchronized receiver.

11. The method of claim 1, further comprising performing CFO correction for each of a plurality of users.

12. The method of claim 1, further comprising tracking frequency variation due to Doppler frequency variation from a moving mobile user.

13. The method of claim 1, wherein the sub-frame is either a Wi-Fi, orthogonal frequency division multiplexing (OFDM), or Long-Term Evolution (LTE) sub-frame, and wherein each transmitting user uses an entirety of a frequency band, and further comprising providing SFO correction at an access point or base station.

14. The method of claim 1, further comprising performing ICI correction for ICI error that is not correctable in the frequency domain.

15. The method of claim 1, wherein CFO error comprises frequency synchronization error and SFO error comprises phase synchronization error.

16. The method of claim 1, further comprising obtaining the CFO correction signal by either a frequency offset estimation method in the time domain, a frequency offset estimation method in the frequency domain, or a frequency offset estimation method in the time domain and in the frequency domain.

17. The method of claim 1, wherein obtaining the CFO correction signal further comprises:
   downconverting a received orthogonal frequency division multiplexed (OFDM) signal to baseband;
   identifying, from the downconverted received signal, a series of OFDM symbols in a time domain;
   performing a fast Fourier transform (FFT) on a block of several time domain samples to turn the time domain OFDM symbols into frequency domain OFDM symbols, one sample per subcarrier in the received OFDM signal;
   computing a cross-correlation between in-phase and quadrature samples in each subcarrier and for each frequency domain OFDM symbol, wherein the cross-correlation is computed as a sum of products of either squares or absolute values of the in-phase and quadrature samples; and summing the computed cross-correlation across the series of symbols and across all subcarriers to determine a frequency offset for the received OFDM signal.

18. The method of claim 17, wherein the received OFDM signal is quadrature amplitude modulation (QAM) modulated and the received OFDM signal is a Wi-Fi, WiMAX, WiGig, or Long Term Evolution (LTE) signal.

19. The method of claim 17, further comprising obtaining resource blocks for each user using bandpass filtering on time domain samples, and obtaining frequency offset for each user using the per-user resource blocks.

20. A system, comprising:
a radio receive chain for receiving an input orthogonal frequency domain multiplexed (OFDM) signal;
a baseband processor coupled to the radio receive chain and capable of computing a Fourier transform; and
a non-transitory computer-readable medium comprising instructions that, when executed by the baseband processor, cause the system to perform steps comprising:
obtaining orthogonal frequency division multiplexed (OFDM) symbols from the input OFDM signal that are in a time domain;
performing a Fourier transform on the time domain OFDM symbols to obtain OFDM symbols in a frequency domain;
determining a frequency offset based on an estimated correlation between the in-phase signal samples and the quadrature signal samples summed over each subcarrier and summed over each frequency domain OFDM symbol;
receiving a sub-frame via a radio receive chain in the time domain;
performing per-user filtering on the sub-frame to obtain a signal for a particular user;
obtaining a CFO correction signal;
adding the CFO correction signal in the time domain to perform a CFO correction step on the signal for the particular user;
performing an FFT on an output of the CFO correction step to obtain samples in the frequency domain;
adding an SFO correction signal in the frequency domain to perform an SFO correction step on an output of the FFT; and
demodulating an output of the SFO correction step,
thereby performing CFO correction in the time domain and SFO correction in the frequency domain.

21. The system of claim 20, further comprising: an antenna for receiving time domain samples; a carrier frequency offset correction module coupled to a time domain portion of the radio receive chain; a fast Fourier transform module coupled to an output of the carrier frequency offset correction module; and a sampling frequency offset correction module coupled to an output of the fast Fourier transform module.

* * * * *